United States Patent

Delp et al.

[11] Patent Number: 5,940,404
[45] Date of Patent: Aug. 17, 1999

[54] METHOD AND APPARATUS FOR ENHANCED SCATTER MODE ALLOWING USER DATA TO BE PAGE ALIGNED

[75] Inventors: Gary Scott Delp, Rochester; Albert Alfonse Slane, Oronoco, both of Minn.

[73] Assignee: International Business Machines Corporation, Armonk, N.Y.

[21] Appl. No.: 08/846,336

[22] Filed: Apr. 30, 1997

[51] Int. Cl.[6] .................................. H04J 3/16; H04J 3/22
[52] U.S. Cl. ....................... 370/465; 395/200.42; 395/824
[58] Field of Search ...................................... 370/465, 473, 370/474, 475, 476; 395/200.42, 200.47, 200.66, 821, 822, 823, 824, 825, 826, 827

[56] References Cited

U.S. PATENT DOCUMENTS

| 5,274,768 | 12/1993 | Traw et al. . | |
|---|---|---|---|
| 5,528,587 | 6/1996 | Galand et al. | 370/412 |
| 5,548,587 | 8/1996 | Bailey et al. . | |
| 5,602,853 | 2/1997 | Ben-Michael et al. | 370/474 |
| 5,610,921 | 3/1997 | Christensen . | |
| 5,625,625 | 4/1997 | Oskouy et al. . | |
| 5,737,638 | 4/1998 | Byrn et al. | 395/888 |
| 5,761,427 | 6/1998 | Shah et al. | 395/200.53 |
| 5,828,903 | 10/1998 | Sethuram et al. | 395/873 |

*Primary Examiner*—Ajit Patel
*Assistant Examiner*—Bob A. Phunkulh
*Attorney, Agent, or Firm*—Joan Pennington

[57] ABSTRACT

A method and apparatus are provided for enhanced scatter mode allowing user data to be page aligned in a memory. An adapter is coupled between a data communications network and the memory. A data packet including protocol header bytes is received from a data communications network by the adapter. A variable amount of data is specified for a first scatter page that contains the protocol header bytes. Subsequent sequential pages from the received data packet are transferred, for example, by direct memory access (DMA) operations, to real page addresses in the memory with the sequential pages transferred being page aligned in the memory. A page address is written to a DMA list stored in an adapter memory for the sequential pages transferred. A count value is incremented in a packet header of a number of pages transferred for each sequential page transferred. Responsive to transferring a last page from the received data packet, the first scatter page containing the packet header, the DMA list and the protocol header bytes is transferred to a separate address space in the memory. A small packet or single page size is specified for the adapter. When the total data size of a received packet is less than this small packet size, then the packet is not scattered. A single page mode is performed to transfer the small packet to the memory.

12 Claims, 12 Drawing Sheets

METHOD AND APPARATUS FOR ENHANCED SCATTER MODE ALLOWING USER DATA TO BE PAGE ALIGNED

FIELD OF THE INVENTION

The present invention relates generally to the data processing field, and more particularly, relates to a method and apparatus for enhanced scatter mode allowing user data received from a digital data communications network, multimedia or other system to be page aligned in a host memory.

DESCRIPTION OF THE PRIOR ART

In some communication systems, such as an asynchronous transfer mode (ATM) communications network, data packets are received from the network in small units called cells with arrival times interleaved with cells from other data frames. The cells are assembled to form larger data structures called frames or packets.

An Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. ATM networks are designed to support the integration of high quality voice, video, and high speed data traffic. ATM networks use fixed size cells as a unit of transmission. As technology increases, it is expected that the Asynchronous Transfer Mode (ATM) technology and ATM networks will supply much of the need for high speed multimedia.

Most scatter mechanisms allow a inbound packet to be scattered as it is received into real pages of some fixed size. As it is scattered, a direct memory access (DMA) list is built. The DMA list is used to identify where the data was physically moved. This mechanism works well to allow better memory utilization because maximum sized receive buffers are not needed to receive frames. However, this mechanism has several major disadvantages. First, for small frames, a great deal of fragmentation can occur. For example, if a 64 byte frame is received and a 4K page size is used, most of the page is wasted. This problem may be solved in the non-scatter environment by using two sizes of receive buffers, small and large. However, selecting the small or large receive buffer presents other challenges. Another problem that scatter mode causes is that the user data is not page aligned because the packet is page aligned instead. As a result, typically an additional data copy must be performed.

It would be advantageous to have a method to alleviate these problems.

SUMMARY OF THE INVENTION

A principal object of the present invention is to provide an improved method and apparatus for enhanced scatter mode allowing user data to be page aligned. Other important objects of the present invention are to provide such method and apparatus substantially without negative effects and that overcome some disadvantages of prior art arrangements.

In brief, a method and apparatus are provided for enhanced scatter mode allowing user data to be page aligned in a memory. An adapter is coupled between a data communications network and the memory. A data packet including protocol header bytes is received from a data communications network by the adapter. A variable amount of data is specified for a first scatter page that contains the protocol header bytes. Subsequent sequential pages from the received data packet are transferred, for example, by direct memory access (DMA) operations, to real page addresses in the memory with the sequential pages transferred being page aligned in the memory. A page address is written to a DMA list stored in an adapter memory for the sequential pages transferred. A count value is incremented in a packet header of a number of pages transferred for each sequential page transferred. Responsive to transferring or calculating a last page from the received data packet, the first scatter page containing the packet header, the DMA list and the protocol header bytes is transferred to a separate address space in the memory.

In accordance with a feature of the invention, a small packet or single page size is specified for the adapter. When the total data size of a received packet is less than this small packet size, then the packet is not scattered. A single page mode is performed to transfer the small packet to the memory.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
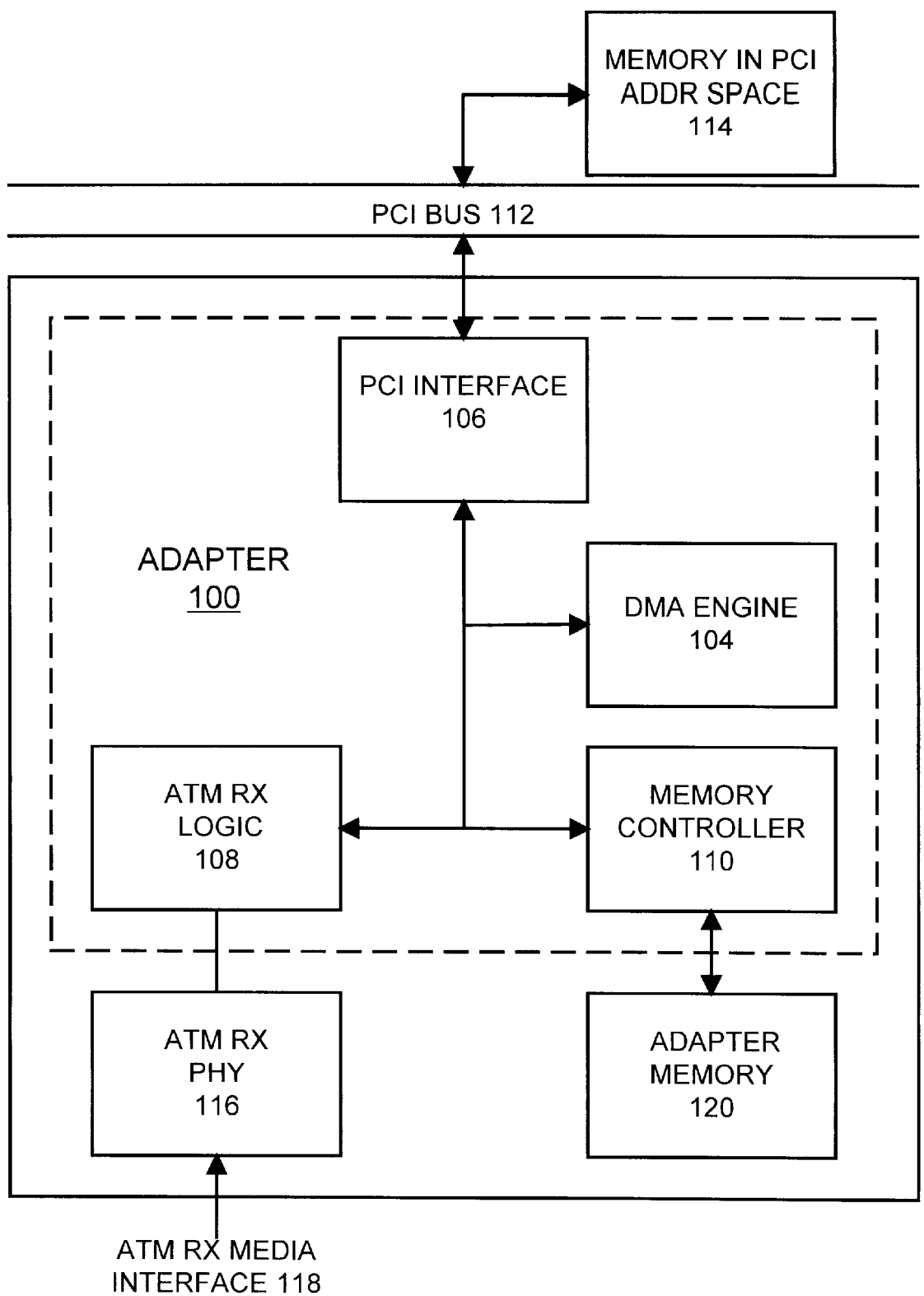
FIG. 1 is a block diagram representation illustrating an adapter and an adapter memory of the preferred embodiment with the adapter coupled between a data communication network system and a peripheral component interconnect (PCI) bus and a PCI memory.

Having reference now to the drawings in FIG. 1, there is shown an adapter generally designated by 100 and arranged in accordance with the preferred embodiment. As shown in FIG. 1, adapter 100 includes a direct memory access (DMA) engine 104, a peripheral component interconnect (PCI)

interface 106, an asynchronous transfer mode (ATM) receive logic 108, and a memory controller 110. The PCI interface 106 is connected to a peripheral component interconnect (PCI) bus 112 coupled to a memory 114 in PCI address space. The ATM receive logic 108 is connected to an ATM receive (RX) physical (PHY) layer 116 connected to an ATM RX media interface 118. The memory controller 110 is connected to an adapter memory 120. Adapter 100 provides interface and translator functions between the ATM RX PHY layer 116 and the peripheral component interconnect (PCI) bus 112. Adapter 100 of the preferred embodiment includes a transmission logic (not shown) and a cell scheduler (not shown). Adapter 100 is illustrated in simplified form sufficient for an understanding of the present invention.

In accordance with an important feature of the invention, the adapter 100 performs an enhanced scatter method providing substantial enhancements over a traditional scatter mechanism. First, for each virtual circuit or on a per connection basis, a variable amount of data is specified for a first page or page 0 of the scatter. This first page 0 contains a packet header, a DMA list and protocol headers bytes of the receive packet that a system device driver (not shown) needs to examine. Note that the number of protocol headers bytes often is known for the mainline case on a per connection basis, for example, transmission communication protocol (TCP), user datagram protocol (UDP) and local area network (LAN) emulation (LE). In the non-mainline case, for example, with internet protocol (IP) the protocol headers bytes may contain optional bytes so that the number of protocol headers bytes may be off by several bytes. By specifying a variable amount of data for the first page 0, all of the user data that follows is page aligned. The initial user data is DMAed to a host memory followed by the first page 0 which contains the DMA list. The first page 0 is DMAed into a separate small buffer in host storage 114 after the packet is completely received. As a packet is received, sequential pages 1 through N are DMAed to the host memory 114 and the DMA list is built following a packet header. This is illustrated and described with respect to FIGS. 3A and 3B and the flow chart of FIGS. 6–9. When the packet completes and passes all error checking, the packet header, DMA list, and the protocol header bytes are all DMAed in the first page 0 into a separate host buffer in the PCI memory 114.

Another important feature of the invention is that on a per chip basis or for adapter 100, a small packet size or single page size is specified. If a packet is received and the total data size is less than this small packet size, then the packet is not scattered. This allows small packets to be kept together to avoid using a whole real page just to hold a few bytes of data. Without this mechanism, a small packet would use both a small buffer to hold the packet header, DMA list and the protocol header bytes and a full real page to hold just a few receive packet bytes in the PCI memory 114. The small packet size is typically set to 128–512 bytes based on fragmentation requirements. The small packet, including a packet header, DMA list (which is empty), protocol header bytes and the received packet, is DMAed in a single burst. This is illustrated and described with respect to FIG. 4B and the flow chart of FIGS. 6 and 7. It should be understood that an optimization can be made so that the empty DMA list in the small packet is not DMAed by adjusting a receive offset in the packet header.

Figure 2:
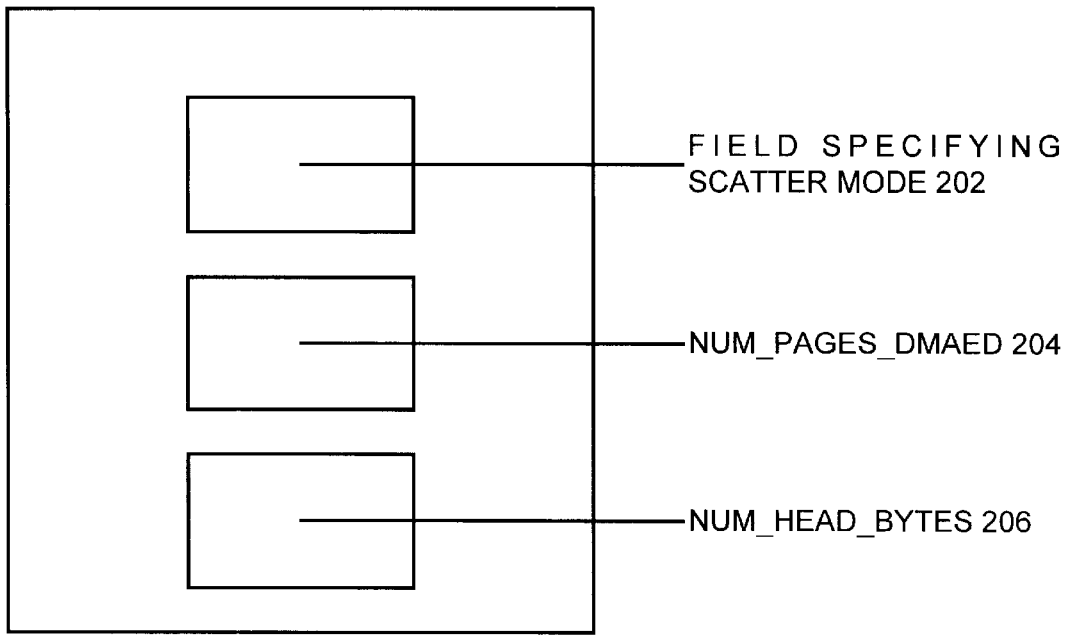
FIG. 2 is a diagram illustrating a logical channel descriptor or connector setup information and chip wide information used by the adapter of the preferred embodiment.

FIG. 2 illustrates a logical channel descriptor or connector setup information 200 including predetermined fields specifying scatter mode 202, a number of pages DMAed (NUM_PAGES_DMAED) 204 that is incremented with each page DMAed, and protocol header bytes (NUM_HEAD_BYTES) 206. As shown in FIG. 2, chip wide information 208 used by the adapter 100 includes a system page size 210 for the PCI memory 114 and a single page size (SINGLE_PAGE_SIZE) 212 for the single page mode when the packet is not scattered.

Figure 3A:
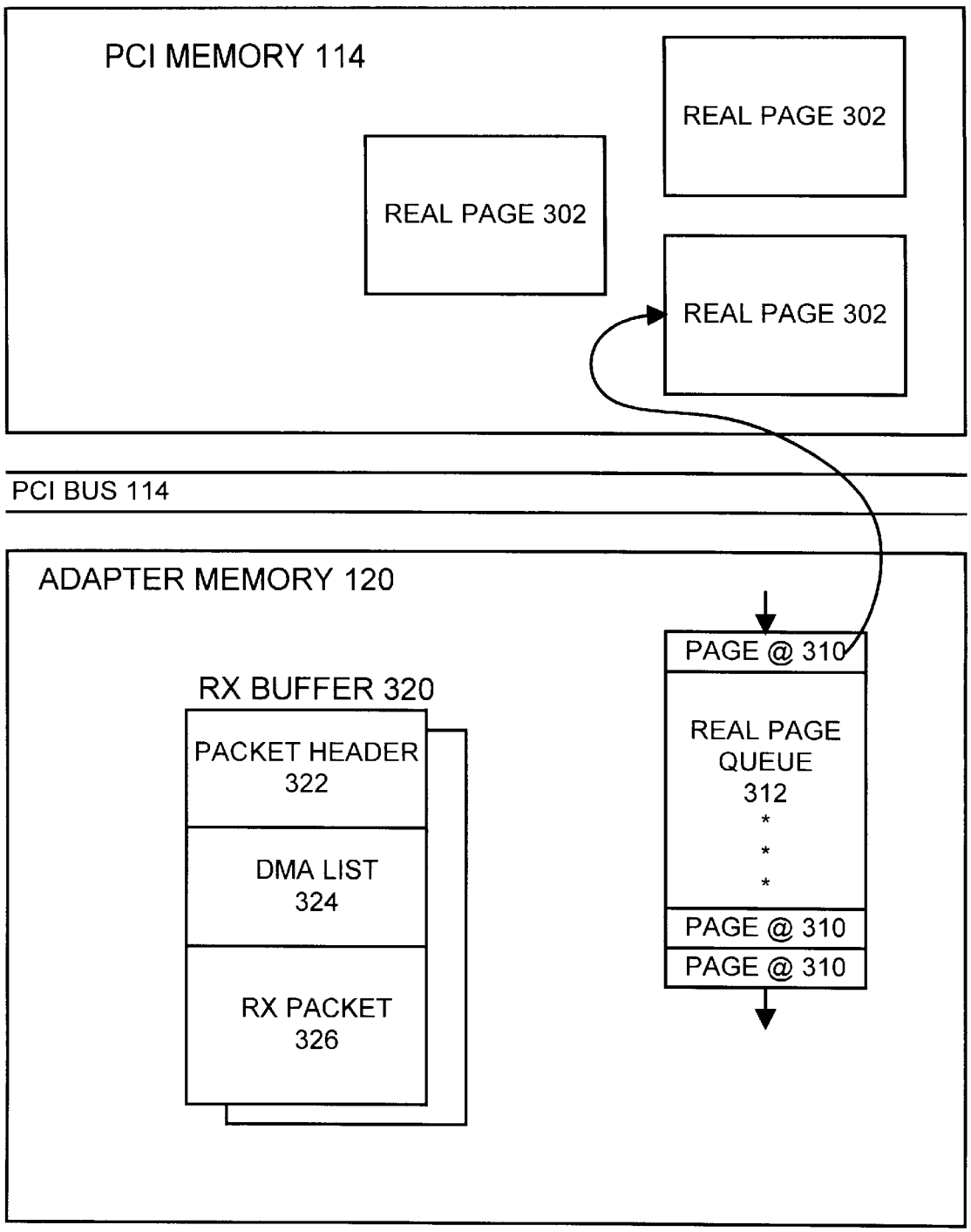
FIG. 3A is a diagram illustrating real page queues DMAed to the PCI memory with a real page address queue in an adapter memory and a DMA list built with a receive buffer packet header in the adapter memory.

FIG. 3A illustrates DMA operations of real page queues 300 in the PCI memory 114 of multiple real pages 302. As shown in FIG. 3A, a plurality of real page addresses 310 in a real page queue 312 are stored in the adapter memory 120. A receive scatter packet buffer 320 in the adapter memory 120 includes a packet header 322, a DMA list 324 and a receive packet data 326. The DMA list 324 is illustrated in more detail in FIG. 4 and contains physical page addresses 404 for multiple real pages 1-N in the memory space 114.

Figure 3B:
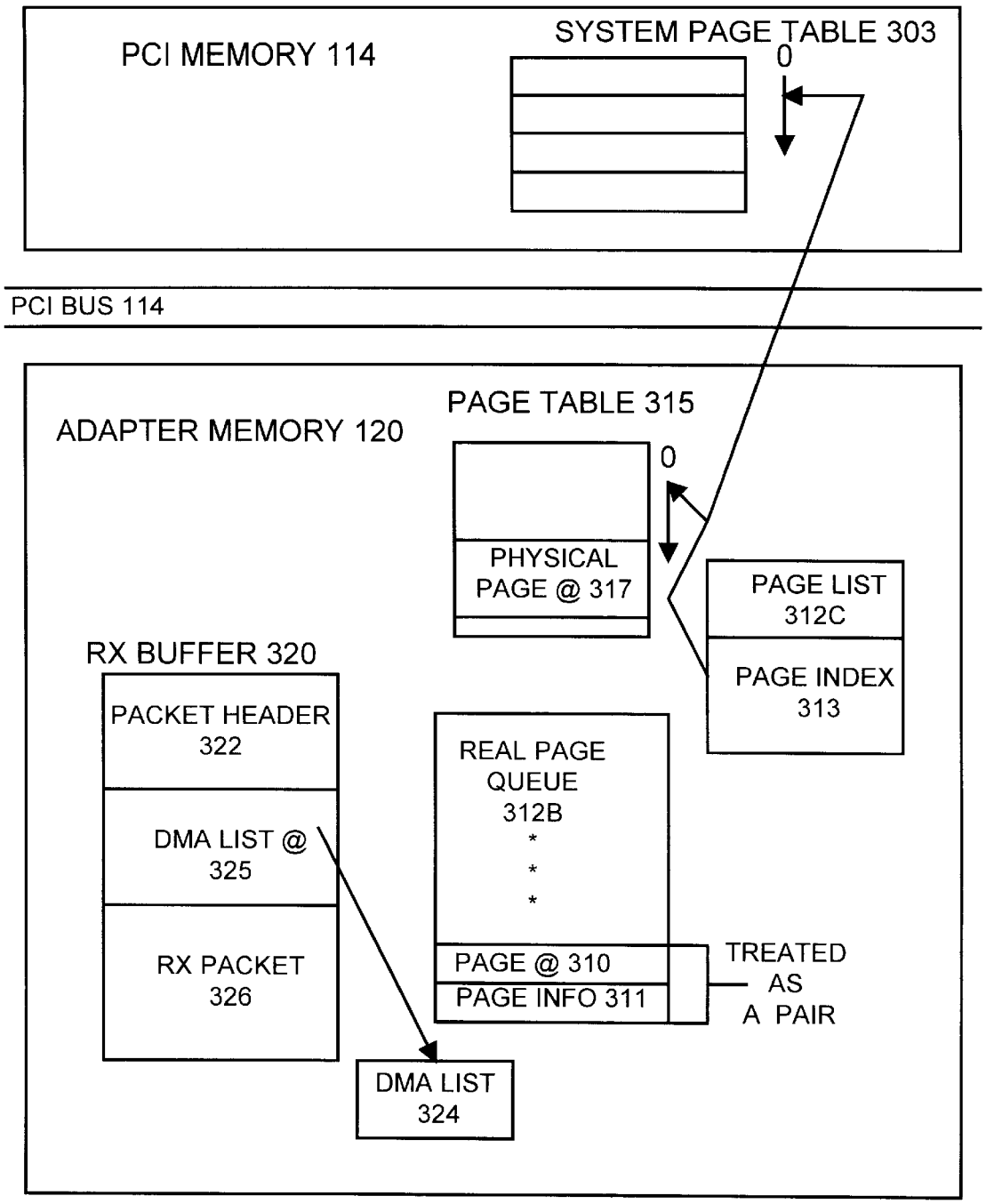
FIG. 3B is a diagram illustrating alternative arrangements real page queues and an alternative separately stored DMA list in the adapter memory.

FIG. 3B illustrates alternative page queue arrangements 312B and 312C that could be used for communications from the adapter 100 to the PCI memory address space 114. For example, a real page queue 312B stored in the adapter memory 120 includes the page address 310 with a page information 311 that are treated as a pair. The pair of page address 310 and page information 311 provide system memory references to memory address space 114.

In FIG. 3B, an alternative example of a page list 312C is shown. The page list 312C can be used with a page index 313 pointing to a page table 315 including physical page addresses 317 in the adapter memory 120 and a system page table 303 of physical page addresses of real pages 302 in the PCI memory 114. A receive scatter packet buffer 320 in the adapter memory 120 includes a packet header 322, a DMA list address 325 and a receive packet data 326. As shown in FIG. 3B, the DMA list address 325 points to a separately stored DMA list 324 in the adapter memory 120.

Figure 4A:
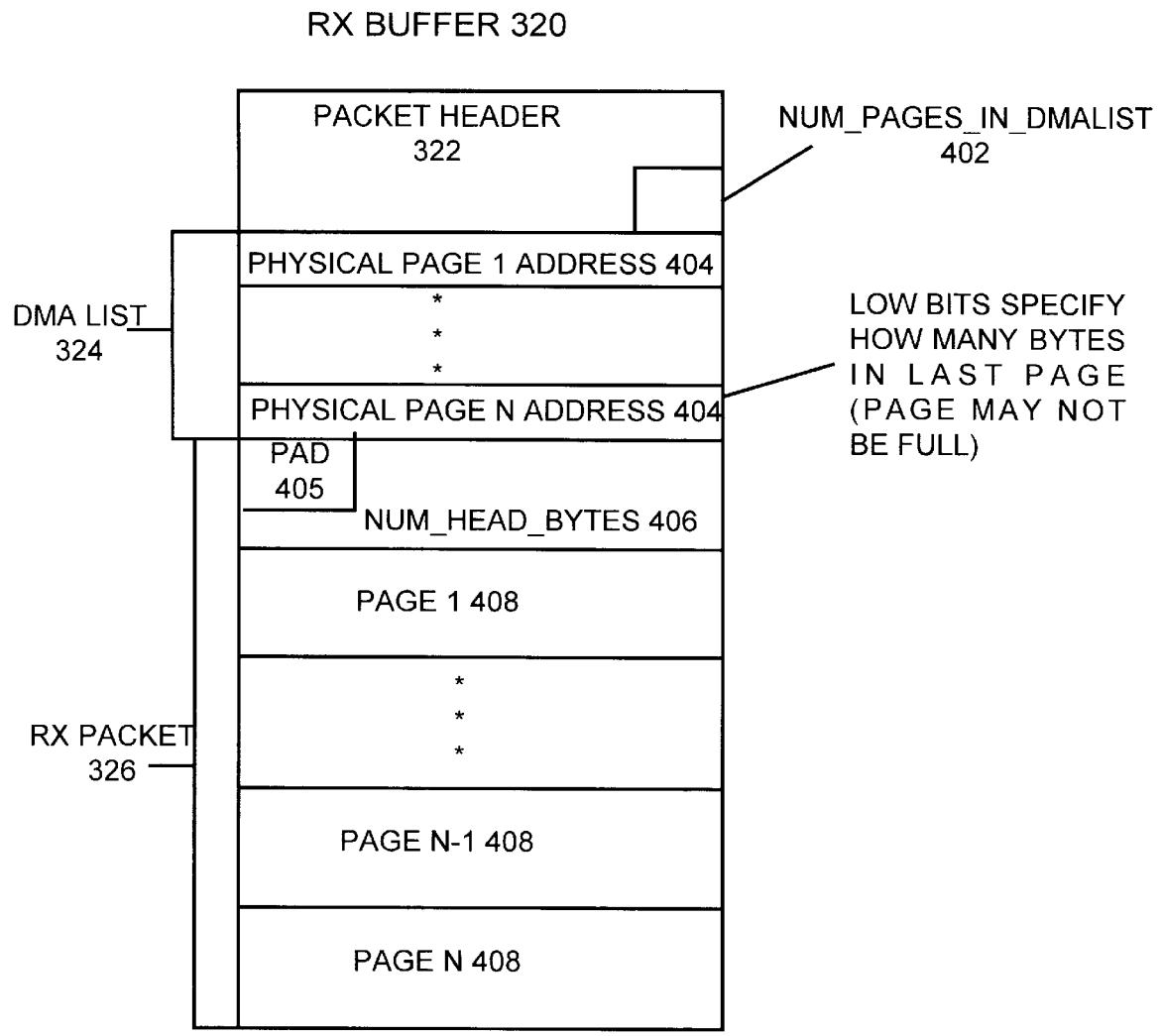
FIG. 4A is a more detailed diagram illustrating a receive scatter packet buffer including a packet header, DMA list, protocol header bytes, and receive packet data pages 1 through N of the preferred embodiment.

FIG. 4A provides a more detailed illustration of the receive scatter packet buffer 320. As shown in FIG. 4A, the packet header 322 includes a predefined field 402 specifying a number of pages in the DMA list 324 (NUM_PAGES_IN_DMALIST). The DMA list 324 includes physical page addresses 404 for physical pages 1-N. Low bits in the physical page N address specify how many bytes are in the last page N which may not be full. The RX packet 326 includes a pad 405 defining an offset, typically zero, for the start of the protocol header bytes (NUM_HEAD_BYTES) 406 which specify how large protocol data bytes are and data pages 1 through N 408. It should be understood that the receive packet buffer 320 can include separate storage space for the DMA list 324 and the receive packet 326 with a smaller minimum size for the packet header 322.

Figure 4B:
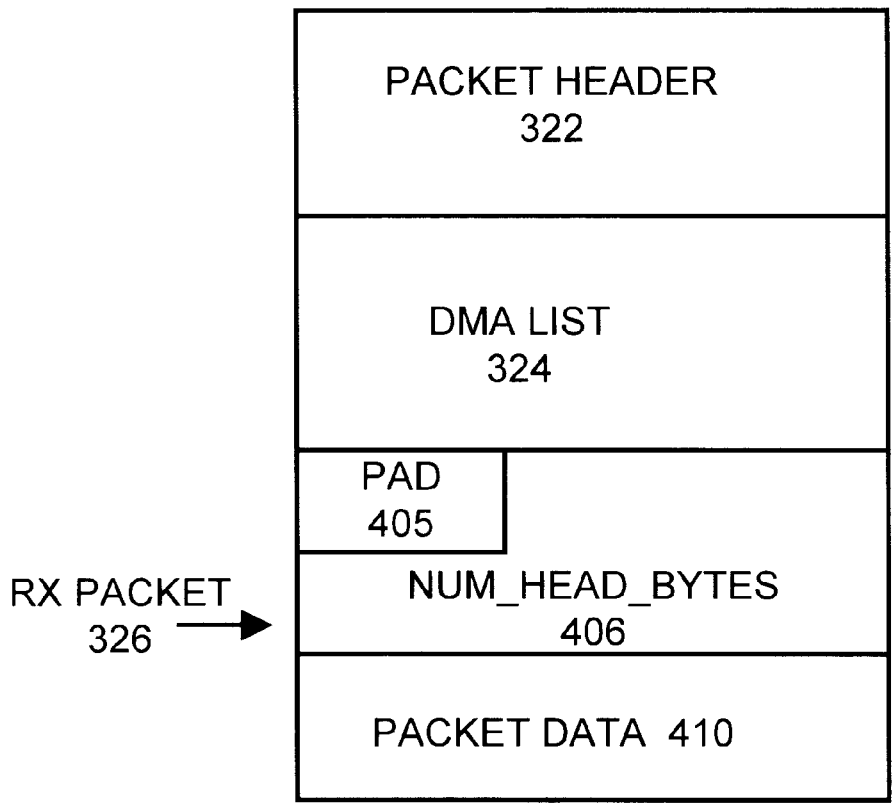
FIG. 4B is a diagram illustrating a receive single page size buffer including a packet header, DMA list (which is empty), and receive packet data which are all DMAed into the PCI memory in a single burst by the adapter of the preferred embodiment.

FIG. 4B illustrates a receive single page size buffer 320 including the packet header 322, DMA list 324 (which is empty), and receive packet 326, including pad 405, the protocol header bytes (NUM_HEAD_BYTES) 406 and packet data 410. As shown in FIG. 4B, a total_size is equal to the sum of the packet header size, the DMA list size and the packet data size. The single page mode is provided by adapter 100 when the total_size is less than the predetermined single_page_size 212. A single page size buffer is DMAed into the PCI memory in a single burst by the adapter 100.

Figure 5:
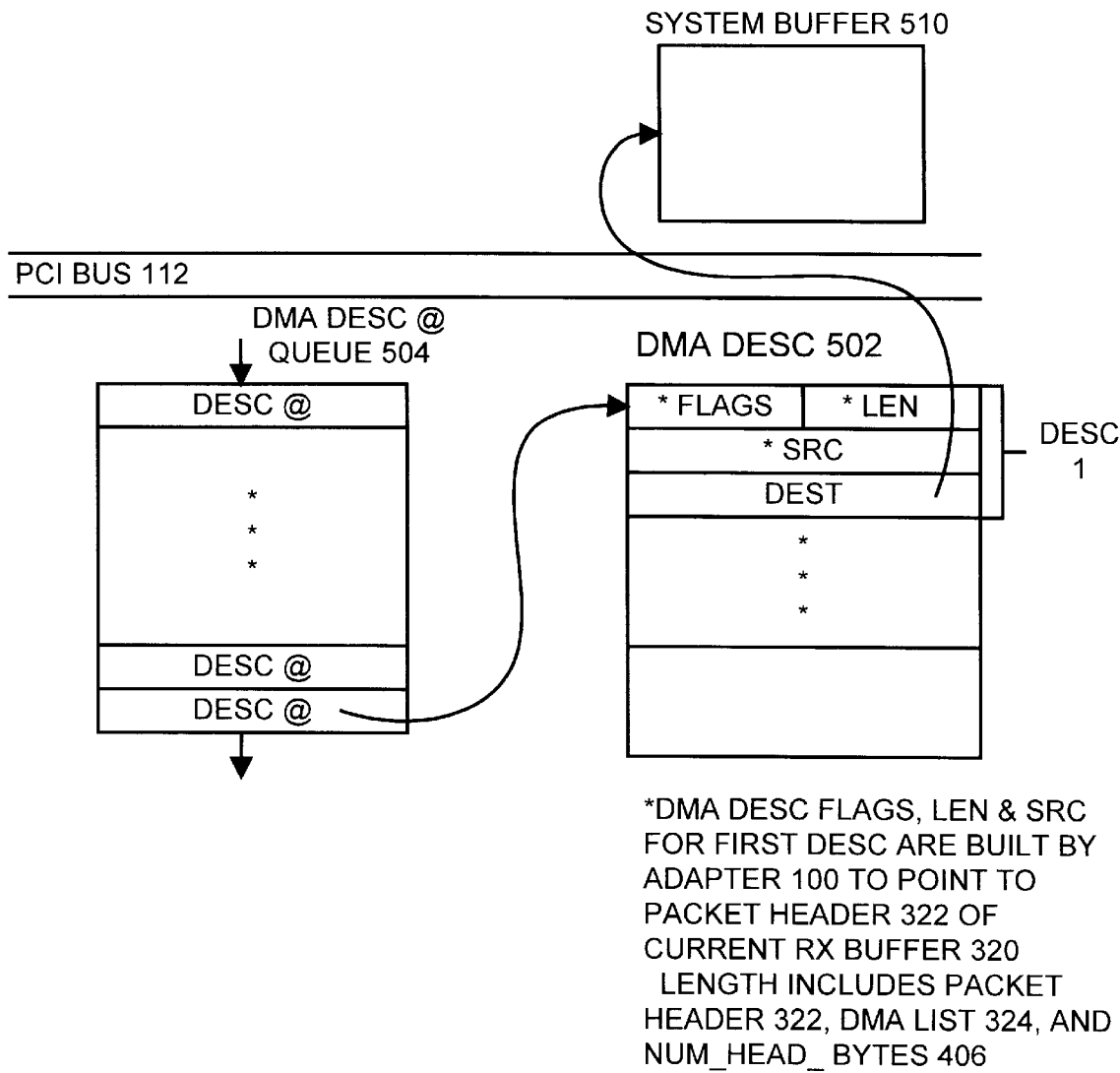
FIG. 5 is a diagram illustrating a DMA descriptor address queue for DMA descriptors DMAed to a PCI system buffer by the adapter of the preferred embodiment.

FIG. 5 illustrates a DMA descriptor block or chain 502 pointed to by a DMA descriptor address queue 504. Each DMA descriptor 502 includes flags, length (LEN), a source address (SRC) and a destination address (DEST). As shown in FIG. 5, the DMA descriptor flags, length (LEN), source address (SRC) and destination address (DEST) for the first DMA descriptor are built by the adapter 100 to point to the packet header 322 of the current receive buffer 320. The length (LEN) includes the packet header 322, DMA list 324, and the protocol header bytes (NUM_HEAD_BYTES) 406. The packet header 322, DMA descriptor block 502 and the protocol header bytes (NUM_HEAD_BYTES) 406 are DMAed to a separate system buffer 510 in the PCI memory address space 114.

Figure 6:
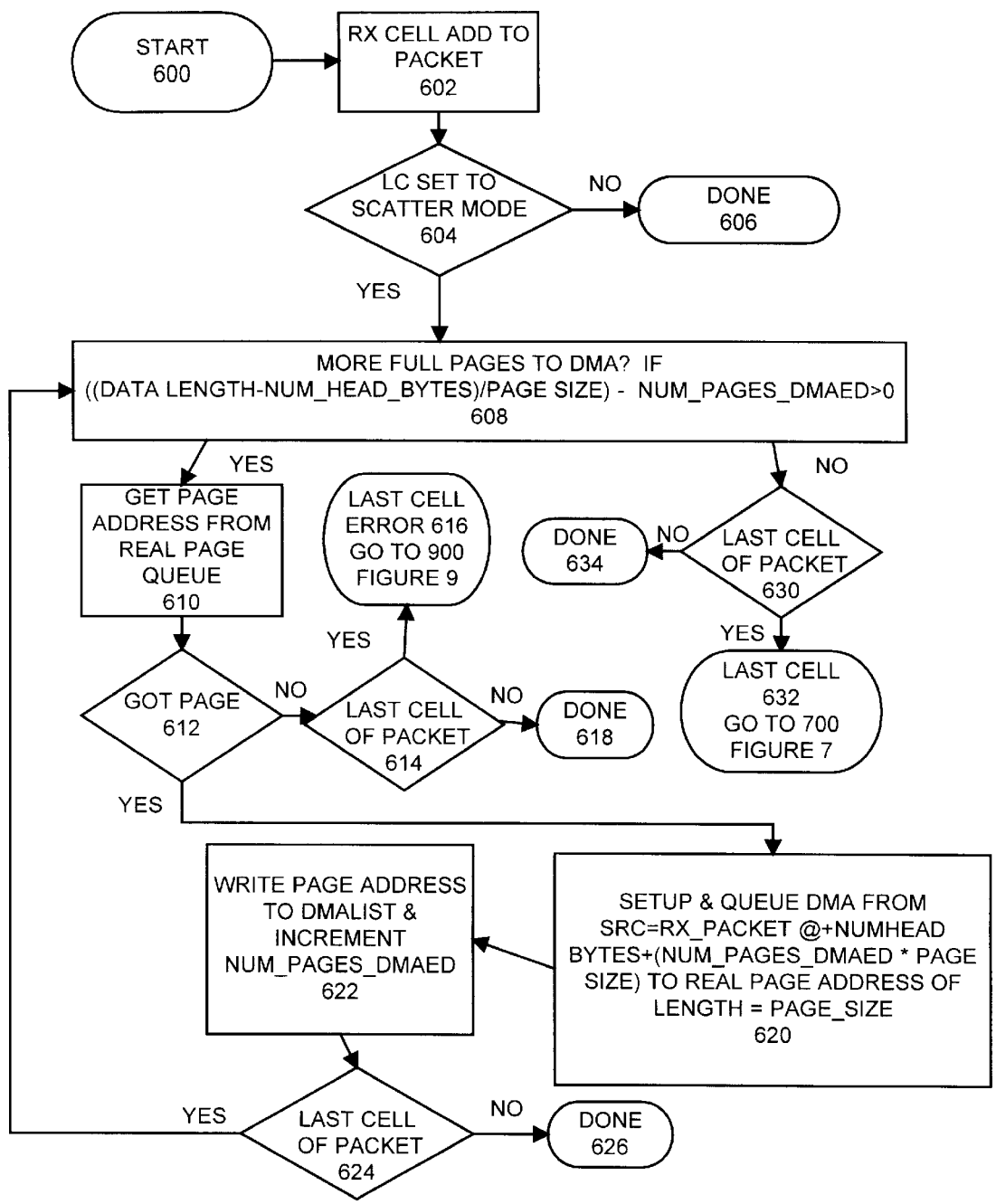
FIGS. 6, 7, 8 and 9 together provide a flow chart illustrating sequential operations performed by the adapter of the preferred embodiment.

Referring now to FIG. 6, sequential operations performed by the adapter 100 start at a block 600. A receive cell is added to a receive packet as indicated at a block 602. Checking whether the logical connection (LC) is set to scatter mode is performed by checking the field specifying scatter mode 202 in the connection setup information 200 as indicated at a decision block 604. If scatter mode is not set, then the sequential operations are done as indicated at a block 606. Otherwise, when scatter mode is set, then checking for more full pages to DMA to the PCI memory 114 is performed by determining whether ((DATA LENGTH−NUM_HEAD_BYTES)/Page Size)—NUM_PAGES_DMAED>0 as indicated at a decision block 608.

When determined there are more full pages to DMA to the PCI memory 114, then a page address 310 is obtained from the real page queue 312 as indicated at a block 610. Checking whether a page is obtained is performed as indicated at a decision block 612. If a page is not obtained, then checking for a last cell of packet is performed as indicated at a decision block 614. If the last cell of packet is identified, then a last cell error sequence is performed starting at a block 900 in FIG. 9 as indicated at a block 616. If the last cell of packet is not identified, then the sequential operations are done as indicated at a block 618. Otherwise, when a page is obtained at decision block 612, then the page is setup and queued to be DMAed to a real page 302 of the PCI memory 114 as indicated at a block 620 labeled SETUP AND QUEUE DMA FROM SRC=RECEIVE_PACKET @+NUMHEAD BYTES+(NUM_PAGES_DMAED * PAGE SIZE) TO REAL PAGE ADDRESS OF LENGTH=PAGE_SIZE. Then the page address 310 is written to the DMA LIST and the NUM_PAGES_DMAED is incremented as indicated at a block 622.

Checking for the last cell of packet is performed as indicated at a decision block 624. If the last cell of packet is not identified, then the sequential operations are done as indicated at a block 626. If the last cell of packet is identified, then the sequential operations continue with checking for more full pages to DMA at decision block 608.

When determined there are no more full pages to DMA to the PCI memory 114, then checking for the last cell of packet is performed as indicated at a decision block 630. If the last cell of packet is identified, then a last cell sequence is performed starting at a block 700 in FIG. 7 as indicated at a block 632. If the last cell of packet is not identified, then the sequential operations are done as indicated at a block 634.

Figure 7:
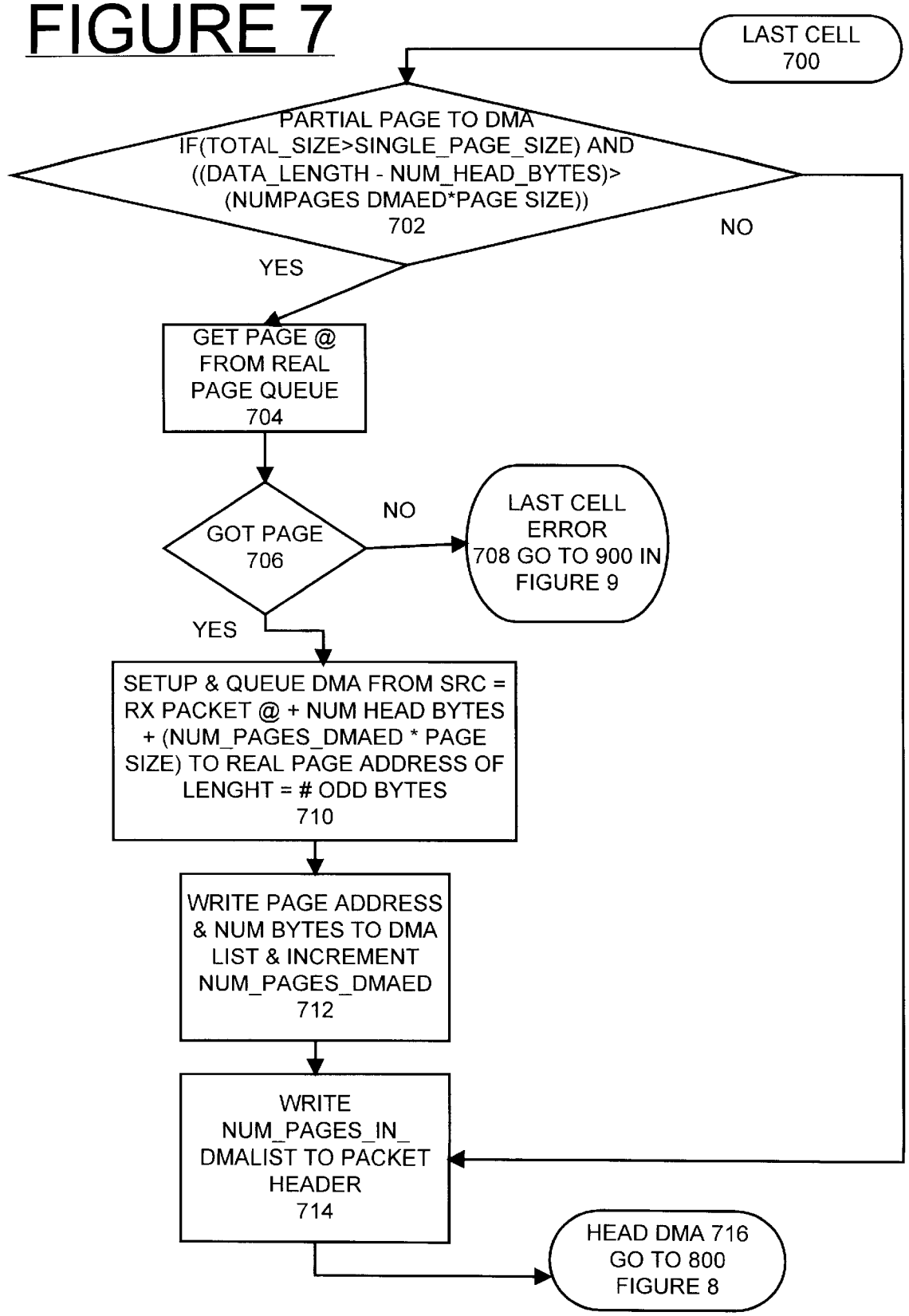

Referring to FIG. 7, the last cell sequence begins at block 700. Checking for a partial page to DMA is performed as indicated at a decision block 702 labeled PARTIAL PAGE TO DMA, IF (TOTAL_SIZE>SINGLE_PAGE_SIZE) AND ((DATA−LENGTH_NUM_HEAD_BYTES)>(NUMPAGES DMAED*PAGE SIZE)). When the TOTAL_SIZE is less than SINGLE_PAGE_SIZE, then the single page mode is performed and the packet is not scattered. If a partial page to DMA is identified at decision block 702, then the page address 310 is obtained from the real page queue 312 as indicated at a block as indicated at a block 704. Checking whether a page is obtained is performed as indicated at a decision block 706. If a page is not obtained, then a last cell error sequence starting at the block 900 in FIG. 9 is performed as indicated at a block 708. Otherwise when a page is obtained, then the partial page is setup and queued to be DMAed to a real page 302 of the PCI memory 114 as indicated at a block 710 labeled SETUP AND QUEUE DMA FROM SRC=RECEIVE PACKET @+NUM HEAD BYTES+(NUM_PAGES_DMAED * PAGE SIZE) TO REAL PAGE ADDRESS OF LENGTH=# ODD BYTES. Then the page address and NUM BYTES of the last page are written to the DMA list 324 and the NUM_PAGES_DMAED is incremented as indicated at a block 712. Next the NUM_PAGES_IN_DMALIST 402 is written to the packet header 402 as indicated at a block 714. Then a head DMA sequence is performed starting at a block 800 in FIG. 8 as indicated at a block 716.

Figure 8:
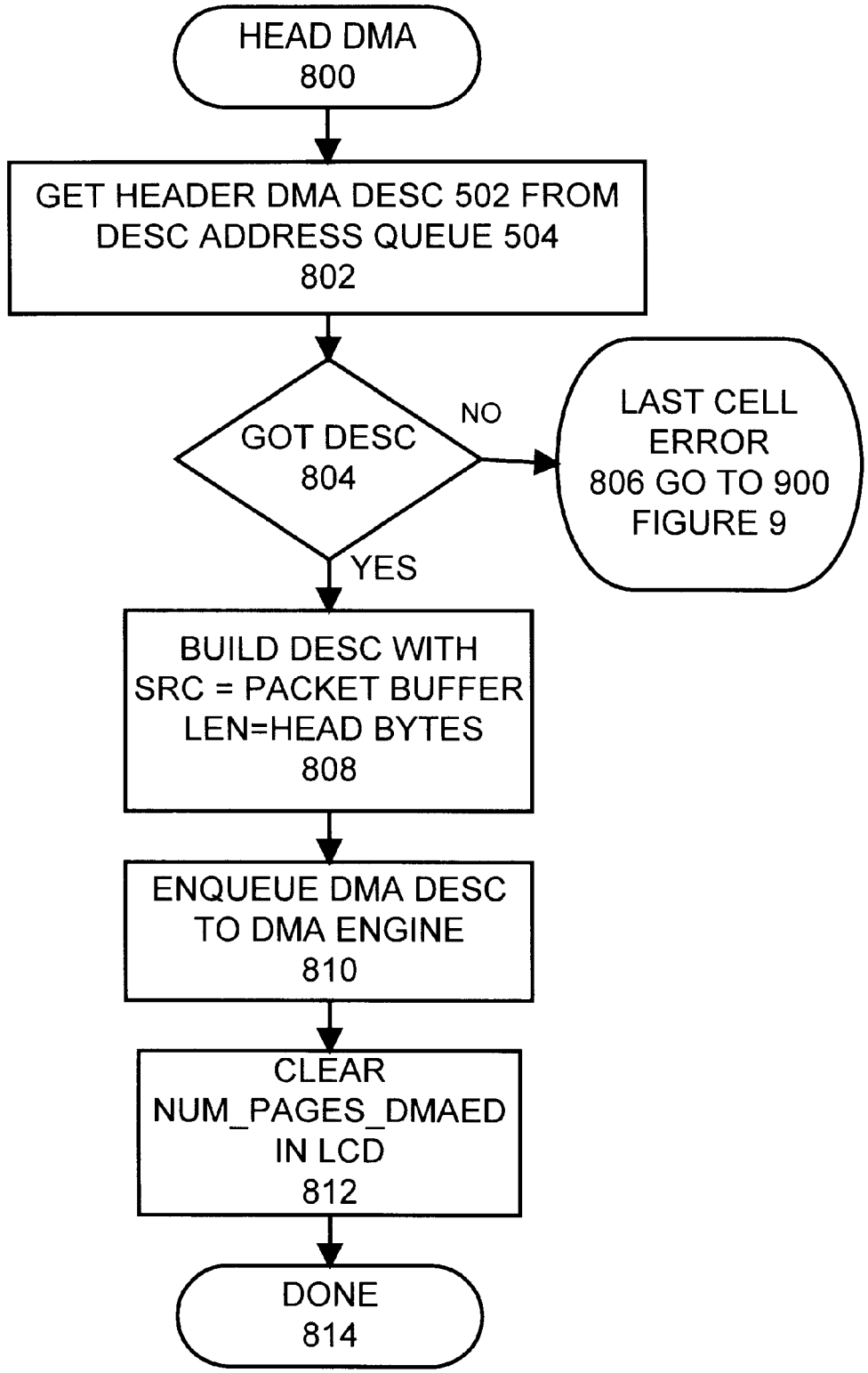
Figure 9:
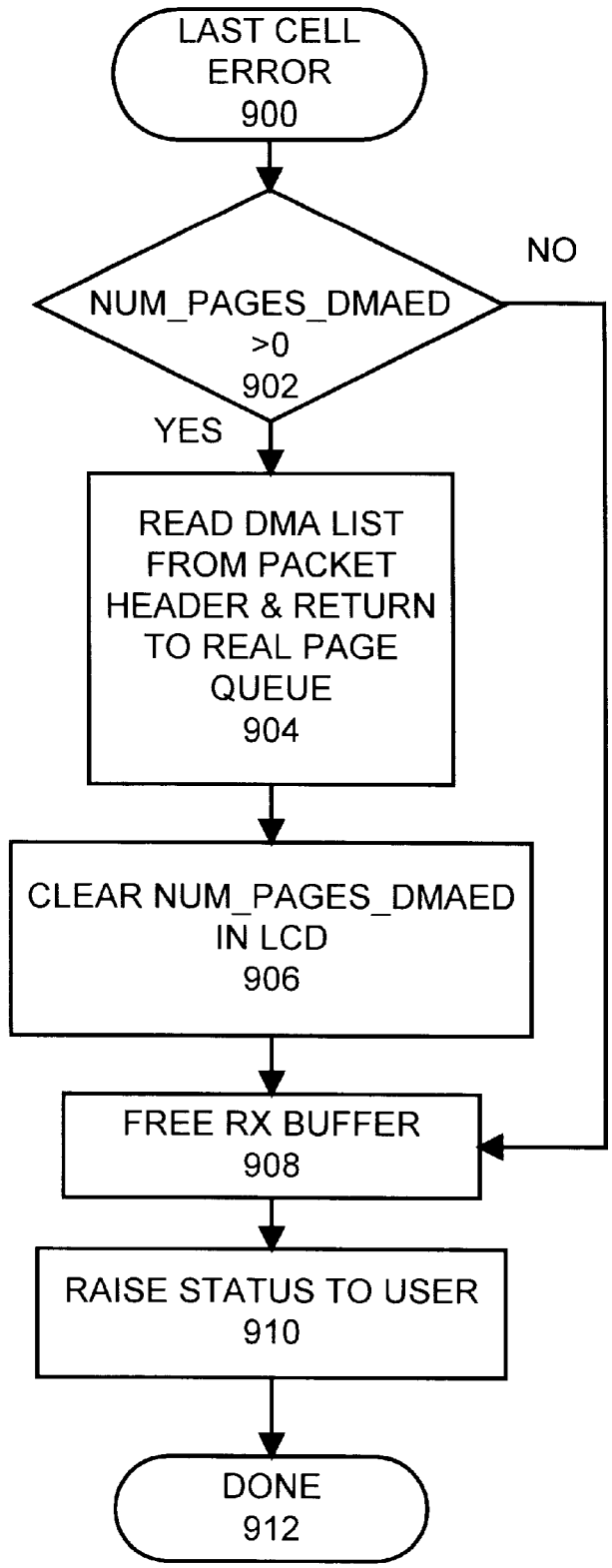

Referring to FIG. 8, the head DMA sequence begins at block 800. First the header DMA descriptor 502 is obtained from descriptor address queue 504 as indicated at a block 802. Checking whether a DMA descriptor 502 was obtained is performed as indicated at a decision block 804. If a DMA descriptor 502 was not obtained, then the last cell error sequence is performed starting at block 900 in FIG. 9 as indicated at a block 806. When a DMA descriptor 502 was obtained, then the first DMA descriptor 502 is built with SRC=PACKET BUFFER and LEN=HEAD BYTES as indicated at a block 808, where HEAD BYTES equals the sum of the packet header size, DMA list size, and the minimum of the actual packet size, or the protocol header bytes (NUM_HEAD_BYTES) 406. The remaining DMA descriptors in the chain have been setup by the user and typically convey information, for example, page 0 real address, to the user. The DMA descriptor 502 is enqueued to DMA engine 104 as indicated at a block 810. Then the NUM_PAGES_DMAED 204 is cleared in the LCD setup information 200 as indicated at a block 812. This completes the sequential operations as indicated at a block 814.

Referring to FIG. 9, the last cell error sequence begins at block 900. Checking whether the number of pages DMAed is greater than zero is performed as indicated at a decision block 902 labeled NUM_PAGES_DMAED>0. If the number of pages DMAed is greater than zero, then the DMA list 324 is read from packet header and is returned to the real page queue as indicated at a block 904. Then the NUM_PAGES_DMAED 204 is cleared in the LCD setup information 200 as indicated at a block 906. After the NUM_PAGES_DMAED 204 is cleared and when determined at decision block 902 that the number of pages DMAed is not greater than zero, then the receive buffer is freed as indicated at a block 908. An error status is raised to user as indicated at a block 910. This completes the sequential last cell error operations as indicated at a block 912.

Figure 10:
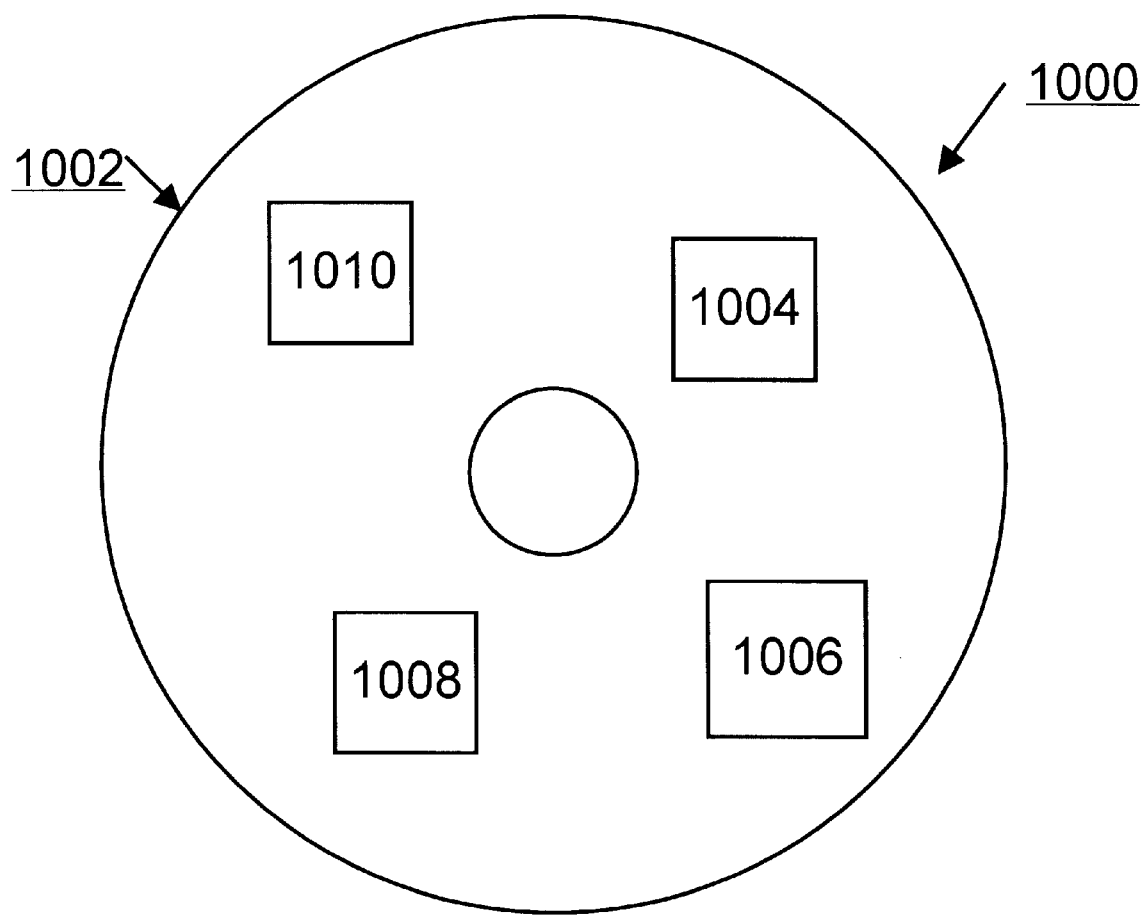
FIG. 10 is a block diagram illustrating a computer program product in accordance with the invention.

Referring now to FIG. 10, an article of manufacture or a computer program product 1000 of the invention is illustrated. The computer program product 1000 includes a recording medium 1002, such as, a floppy disk, a high capacity read only memory in the form of an optically read compact disk or CD-ROM, a tape, a transmission type media such as a digital or analog communications link, or a similar computer program product. Recording medium 1002 stores program means 1004, 1006, 1008, 1010 on the medium 1002 for carrying out the enhanced scatter mode methods of the preferred embodiment.

A sequence of program instructions or a logical assembly of one or more interrelated modules defined by the recorded program means 1004, 1006, 1008, 1010, direct adapter 100 for carrying out the enhanced scatter mode functions of the preferred embodiment.

While the present invention has been described with reference to the details of the embodiments of the invention shown in the drawing, these details are not intended to limit the scope of the invention as claimed in the appended claims.

What is claimed is:

1. A method for enhanced scatter mode allowing user data to be page aligned in a memory performed by an adapter coupled between a data communications network and the memory, said method comprising the steps of:

receiving a data packet from the data communications network by the adapter; said received data packet including protocol header bytes;

specifying a variable amount of data for a first scatter page;

transferring sequential pages from the received data packet to real page addresses in the memory; the sequential pages transferred being page aligned in the memory;

writing an address to a DMA list for the sequential pages transferred;

incrementing a count value in a packet header of a number of pages transferred for each sequential page transferred; and responsive to transferring a last page from the received data packet, transferring said first scatter page containing said packet header, said DMA list and said protocol header bytes to a separate address space in the memory.

2. A method for enhanced scatter mode as recited in claim 1 includes the step of specifying a small packet or single page size for the adapter.

3. A method for enhanced scatter mode as recited in claim 2 includes the steps of identifying a total data size of said received packet, comparing said identified total data size with said small packet size to identify a small packet, and performing a single page mode transfer of an identified small packet to the memory.

4. A method for enhanced scatter mode as recited in claim 3 wherein said single page mode transfer of said identified small packet to the memory includes the steps of building a DMA descriptor for said identified small packet and enqueuing said DMA descriptor to a DMA engine to execute said DMA descriptor.

5. A method for enhanced scatter mode as recited in claim 1 includes the step of writing an address to a DMA list for the sequential pages transferred includes the step of specifying a number of bytes in said last page in an address written for said last page.

6. A method for enhanced scatter mode as recited in claim 1 wherein the step of writing an address to a DMA list for the sequential pages transferred includes the step of writing a page address in the memory for the sequential pages transferred to said DMA list stored in an adapter memory.

7. A method for enhanced scatter mode as recited in claim 1 wherein the step of transferring said first scatter page containing said packet header, said DMA list and said protocol header bytes includes the steps of building a DMA descriptor for said first scatter page and enqueuing said DMA descriptor to a DMA engine to execute said DMA descriptor.

8. An adapter for providing enhanced scatter mode allowing user data to be page aligned in a memory, said adapter coupled between a data communications network and the memory, said adapter comprising:

means for receiving a data packet from the data communications network; said received data packet including protocol header bytes;

means for specifying a variable amount of data for a first scatter page;

means for transferring sequential pages from the received data packet to real page addresses in the memory; the sequential pages transferred being page aligned in the memory;

means for writing an address to a DMA list for the sequential pages transferred;

means for incrementing a count value in a packet header of a number of pages transferred for each sequential page transferred; and means, responsive to transferring a last page from the received data packet, for transferring said first scatter page containing said packet header, said DMA list and said protocol header bytes to a separate address space in the memory.

9. An adapter for providing enhanced scatter mode allowing user data to be page aligned in a memory as recited in claim 8 further includes means for specifying a small packet or single page size; means for identifying a total data size of said received packet, means for comparing said identified total data size with said small packet size to identify a small packet, and means for performing a single page mode transfer of an identified small packet to the memory.

10. An adapter for providing enhanced scatter mode allowing user data to be page aligned in a memory as recited in claim 9 wherein said means for performing said single page mode transfer of said identified small packet to the memory includes means for building a DMA descriptor for said identified small packet and means for enqueuing said DMA descriptor to a DMA engine to execute said DMA descriptor.

11. An adapter for providing enhanced scatter mode allowing user data to be page aligned in a memory as recited in claim 8 wherein said means for transferring said first scatter page containing said packet header, said DMA list and said protocol header bytes includes means for building a DMA descriptor for said first scatter page and means for enqueuing said DMA descriptor to a DMA engine to execute said DMA descriptor.

12. A computer program product for use with an adapter for providing enhanced scatter mode allowing user data to be page aligned in a memory, the computer program product comprising:

a recording medium;

means, recorded on said recording medium, for receiving a data packet from a data communications network; said received data packet including protocol header bytes;

means, recorded on said recording medium, for specifying a variable amount of data for a first scatter page;

means, recorded on said recording medium, for transferring sequential pages from the received data packet to real page addresses in the memory; the sequential pages transferred being page aligned in the memory;

means, recorded on said recording medium, for writing an address to a DMA list for the sequential pages transferred;

means, recorded on said recording medium, for incrementing a count value in a packet header of a number of pages transferred for each sequential page transferred; and means, recorded on said recording medium, responsive to transferring a last page from the received data packet, for transferring said first scatter page containing said packet header, said DMA list and said protocol header bytes to a separate address space in the memory.

* * * * *